(12) United States Patent
Tode et al.

(10) Patent No.: US 6,201,532 B1
(45) Date of Patent: Mar. 13, 2001

(54) ELECTRONIC GAMING DEVICE WITH DECK-MOUNTED TOUCHSCREEN

(75) Inventors: Jess Tode; Dan Wilson, both of Bozeman; Bill Wynn, Belgrade, all of MT (US)

(73) Assignee: Powerhouse Technologies, Inc., Bozeman, MT (US)

(*) Notice: Subject to any disclaimer, the term of this patent is extended or adjusted under 35 U.S.C. 154(b) by 0 days.

(21) Appl. No.: 09/107,627

(22) Filed: Jun. 30, 1998

(51) Int. Cl.⁷ ...................................................... G09G 5/00
(52) U.S. Cl. ........................ 345/156; 345/173; 248/917; 361/681; 463/46
(58) Field of Search ............................. D14/130; D21/37, D21/327; 345/156; 361/173, 681; 463/34, 46; 248/917–925

(56) References Cited

U.S. PATENT DOCUMENTS

| | | |
|---|---|---|
| D. 272,920 | 3/1984 | Wichinsky et al. . |
| D. 278,069 | 3/1985 | Wichinsky et al. . |
| D. 284,592 | 7/1986 | Drews et al. . |
| D. 292,423 | 10/1987 | Williams et al. . |
| D. 307,771 | 5/1990 | Cesaroni et al. . |
| D. 332,976 | 2/1993 | Gutknecht et al. . |
| D. 344,122 | 2/1994 | McKay et al. . |
| D. 344,296 | 2/1994 | McKay et al. . |
| 3,774,316 | * 11/1973 | Meier ................................... 436/316 |
| 5,456,468 | * 10/1995 | Stringfellow et al. ........... 273/148 B |
| 5,580,146 | * 12/1996 | Maslow ................................. 353/74 |
| 5,736,975 | * 4/1998 | Lunetta ................................. 345/156 |
| 5,923,319 | * 7/1999 | Bishop et al. ........................ 345/175 |

* cited by examiner

*Primary Examiner*—Dennis-Doon Chow
*Assistant Examiner*—Amr Awad
(74) *Attorney, Agent, or Firm*—Shook, Hardy & Bacon LLP

(57) ABSTRACT

An electronic gaming device is provided that has a cabinet. Within the cabinet is mounted an electronic display device. A deck is pivotally mounted to the cabinet. The deck has an opening therein which is located generally above the display device. A touchscreen is sealingly mounted to the deck within the opening so that the touchscreen is located generally above the display device. The deck may be pivoted away from the cabinet while the touchscreen is sealingly mounted within the deck. This allows the seal between the touchscreen and the deck to be preserved while the deck is pivoted away from the cabinet.

17 Claims, 3 Drawing Sheets

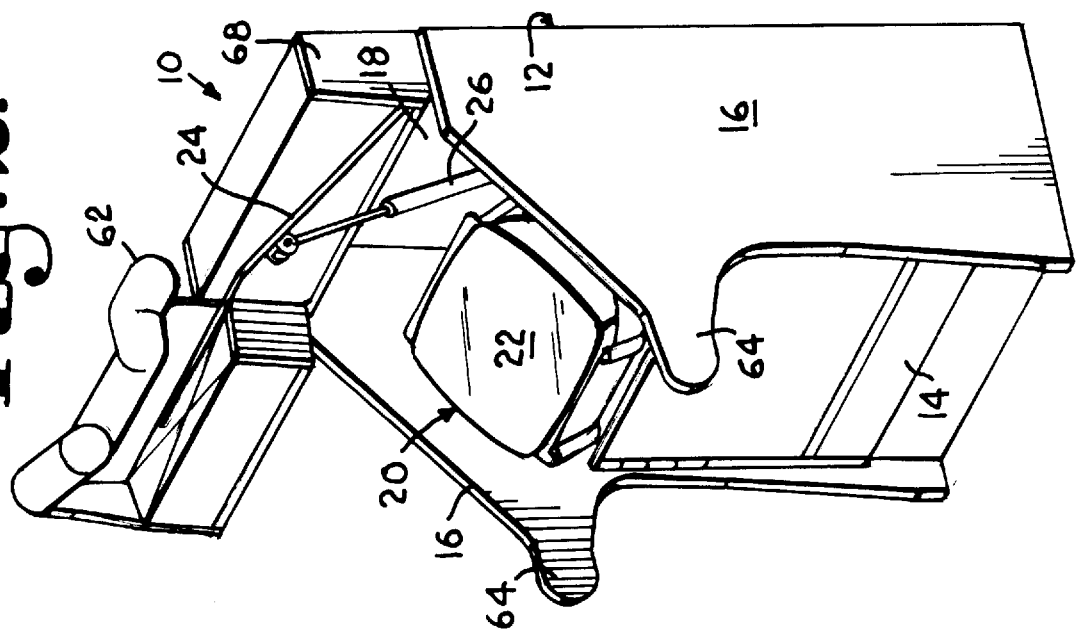
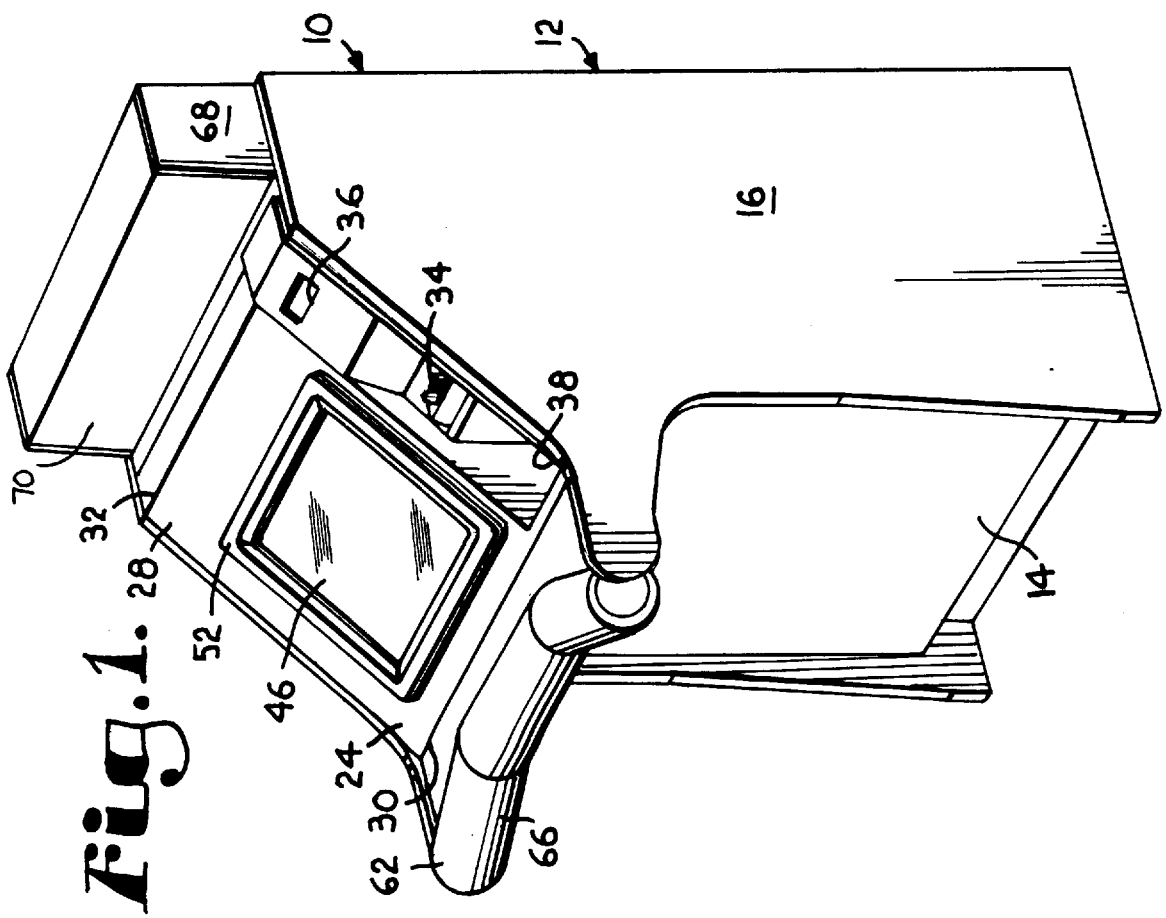

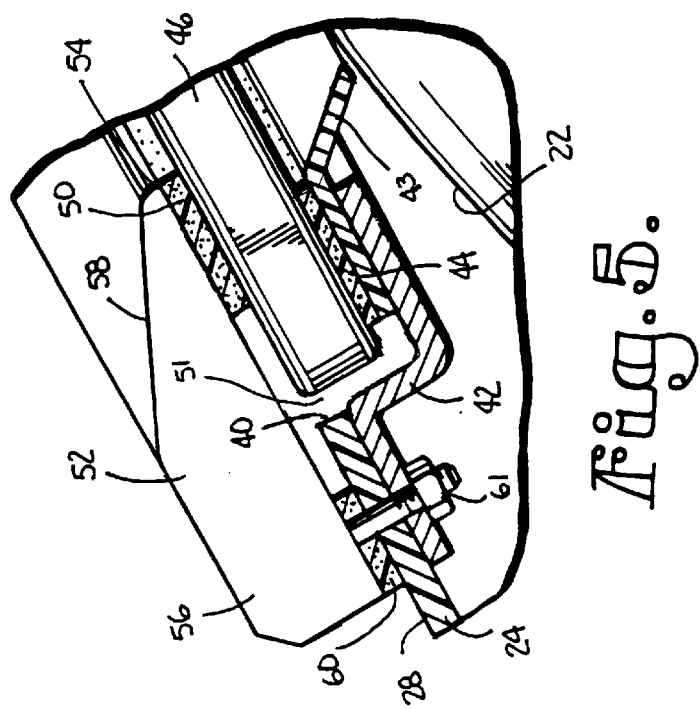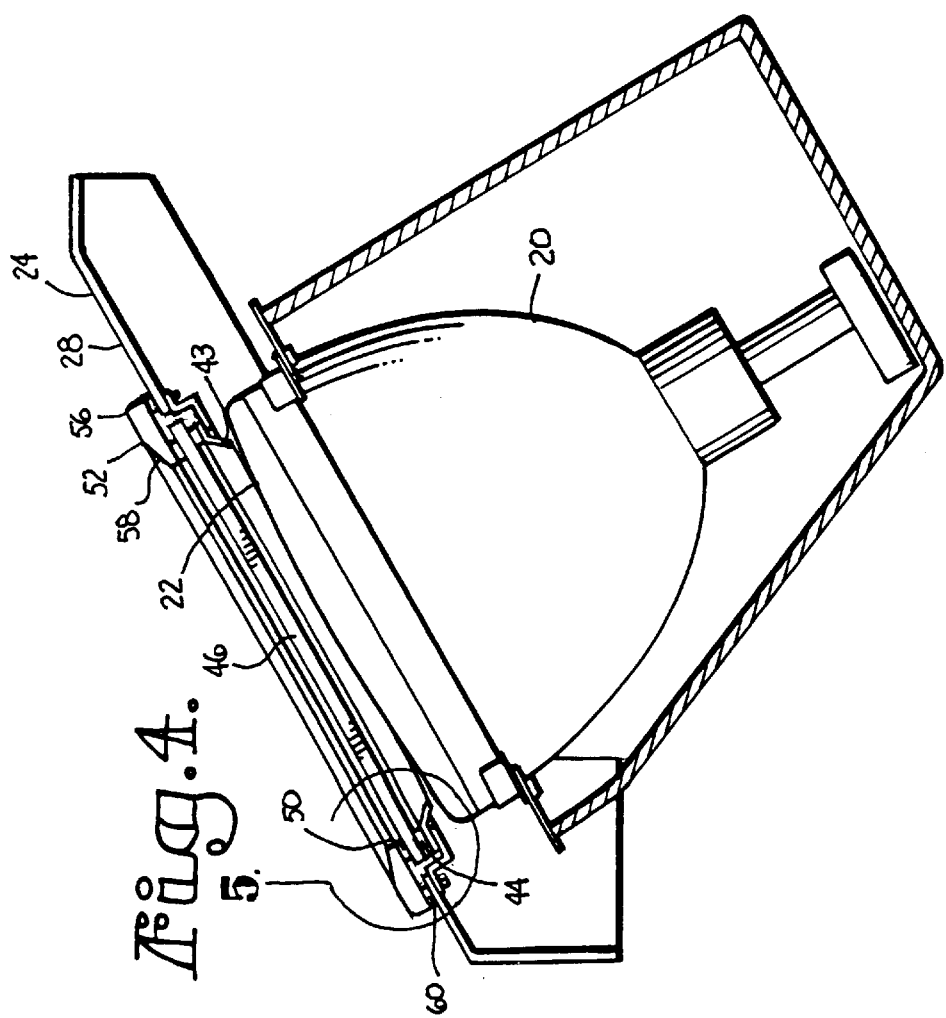

ELECTRONIC GAMING DEVICE WITH DECK-MOUNTED TOUCHSCREEN

STATEMENT REGARDING FEDERALLY SPONSORED RESEARCH OR DEVELOPMENT

Not Applicable.

CROSS REFERENCE TO RELATED APPLICATIONS

Not Applicable.

BACKGROUND OF THE INVENTION

The present invention relates to an electronic gaming device, and more particularly to an electronic gaming device having a deck-mounted touchscreen.

A number of different devices are currently in use within the gaming industry. These devices allow players an opportunity to win money by placing a certain amount of money at risk. The gaming machines typically pay back to the players an overall percentage of the money deposited therein. In general, the owner of the gaming machine desires the machines to be both attractive to, and comfortable for, the players.

Some prior art gaming machines have electronic display screens that display information to the players about the game being played, such as for example a poker hand. In the typical prior art machine, this display screen is oriented in either a vertical orientation or a horizontal orientation. For example, a display screen in a horizontal orientation could be found recessed into a bar, so that a player may play the game while sitting at a bar. However, the vertically or horizontally oriented display screens are disadvantageous due to the glare from overhead lights, and it has been found that they are not be as comfortable in use as is desired.

Many of these gaming machines are also equipped with and electronic touchscreen. The touchscreen allows the player to choose a displayed option or function by simply touching the area of the touchscreen corresponding to the desired option or function. The touchscreen is capable of detecting the position of a user's finger on or adjacent the touchscreen and then transmitting that information to a central processing unit of an onboard computer. A number of different types of touchscreens are currently available. These touchscreens include, for example, capacitive touchscreens, surface acoustic wave touchscreens and guided acoustic wave touchscreens. All of these touchscreens are capable of determining the presence of a player's touch, translating this touch into a machine readable electrical signal and transmitting that signal to the central processing unit of a computer. The computer will then compare the signal received against the position of data or graphical prompts appearing on the display screen. If the coordinates match the location of any given prompt, the processor will then trigger the chosen function. In general, touchscreens are desirable because they allow the player to directly interact with the machine simply by pressing the touchscreen.

In prior art machines, the touchscreen is mounted directly on the display device. Typically the surface of the display device is curved, and so the touchscreen itself is curved in an attempt to match the curve of the display device. In these prior art devices, the touchscreen is supported by and is connected to the surface of the display device. A deck is then placed over the display device and the touchscreen. The deck has an opening therein that allows the touchscreen to be viewed and accessed by the player. A bezel or front facing is then fitted over the deck. The prior art bezel is sealed to the deck about the perimeter of the opening therein. Further, the prior art bezel extends to the surface of the touchscreen and is releasably sealed thereto.

In the gaming machines described above, there is a need to access the interior of the machines on a daily basis. Access to the interior may be necessary to perform maintenance, clear that may occur, and to fill the coin or token hoppers in the interior of the machines. For this purpose, the deck of the machine is hingedly connected to the cabinet of the machine. When the deck is pivoted upwardly to access the interior of the machine, the seal between the bezel and the touchscreen is broken. Therefore, the bezel and the seal are pivoted upwardly with the deck, and the touchscreen and display device remain within the machine.

This arrangement presents a problem in machines with a display device and touchscreen that are not oriented vertically. In machines with non-vertical display devices and touchscreens, the seal between the bezel and the touchscreen is important in that it protects the interior of the machine from damage caused by liquids, such as drinks, which may be spilled onto the surface of the machine. However, in prior art machines, this seal is broken each time the deck is pivoted upwardly. This breaking of the seal makes it difficult to ensure that the bezel is properly sealed to the touchscreen when the deck is returned to a closed position. Moreover, because the touchscreen is mounted to the display device in these prior art machines, the touchscreen itself is curved to match the curvature of the display device. The curvature of the touchscreen surface increases the difficulty of ensuring a seal between the bezel and the touchscreen when the deck is returned to a closed position.

The above-described prior art construction not only presents sealing problems, but also contributes to increase maintenance costs. These increased maintenance costs are caused by the fact that the touchscreen is mounted directly to the display device. If there is a problem or failure of either the touchscreen or the display device, the entire assembly must be replaced. This can increase costs if only one of the two components is the cause of the problem or failure, because a component that is otherwise operable must be replaced merely because it is mounted to another component that has failed or is in need of off-site maintenance.

In the prior art devices, the mounting methods for the touchscreen currently employed can cause problems for the functioning of the touchscreen. The rigid mounting of the touchscreen can lead to uneven pressures being placed on various regions of the touchscreen. This pressure differential can lead to certain areas of the touchscreen malfunctioning, or failing to function.

The above-described prior art gaming machines are typically equipped with an arm rest that will act as a support for the player. These arm rests are used to enhance the comfort of the player and typically extend from one side of the machine to the other. The prior art arm rests are located and constructed to extend straight across the front of the machine. The prior art arm rests do not, therefore, offer the player any form of guided support, which would act to aide in positioning the player laterally along the front of the machine. Further, these prior art arm rests do not offer any support for the player along the side of the player, which may be desirable to increase the comfort of the player.

Therefore, an electronic gaming device is needed that overcomes the above drawbacks and deficiencies of the above-described prior art gaming devices.

SUMMARY OF THE INVENTION

It is an object of the present invention to provide a gaming device with a display screen and touchscreen mounted at a more comfortable angle for the user.

It is a further object of this invention to provide a gaming device that allows the deck of the device to be opened without compromising the seal between the bezel and the touchscreen.

It is yet another object of this invention to provide a gaming device that allows the display screen and touchscreen to be separately maintenanced.

It is still another object of the invention to provide a gaming device with an armrest which comfortably supports a player and centers the player over the centerline of the display of the gaming device.

It is a further object of the invention to provide a mounting method for a touchscreen in a gaming device that evenly distributes the mounting pressures placed upon the touchscreen so that all areas of the touchscreen remain fully functional.

According to the present invention, the foregoing and other objects are obtained by an electronic gaming device that has a cabinet within which is mounted an electronic display device. An upwardly angled deck is pivotally mounted to the cabinet. The deck has an opening therein which is located generally above the display device. A touchscreen is sealingly mounted to the deck within the opening so that the touchscreen is located generally above the display device. The deck may thus be pivoted away from the cabinet while the touchscreen is sealingly mounted within the deck. This allows the seal between the touchscreen and the deck to be preserved while the deck is pivoted away from the cabinet, and allows the touchscreen and the display device to be separately maintenanced. The front of the device is provided with a generally u-shaped arm rest that centers the player over the display device.

Additional objects, advantages, and novel features of the invention will be set forth in part in the description which follows, and in part will become apparent to those skilled in the practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

In the accompanying drawings which form a part of the specification and are to be read in conjuction therewith and in which like reference numerals are used to indicate like part in the various views:

FIG. 1 is a perspective view of an electronic gaming machine according to the present invention;

FIG. 2 is a perspective view, similar to FIG. 1, showing the deck of the gaming machine pivoted upwardly;

FIG. 4 is a partial cross sectional view of the deck and display device; and

FIG. 5 is an enlarged view of the encircled region 5 of FIG. 4.

DETAILED DESCRIPTION OF THE INVENTION

Figure 3:
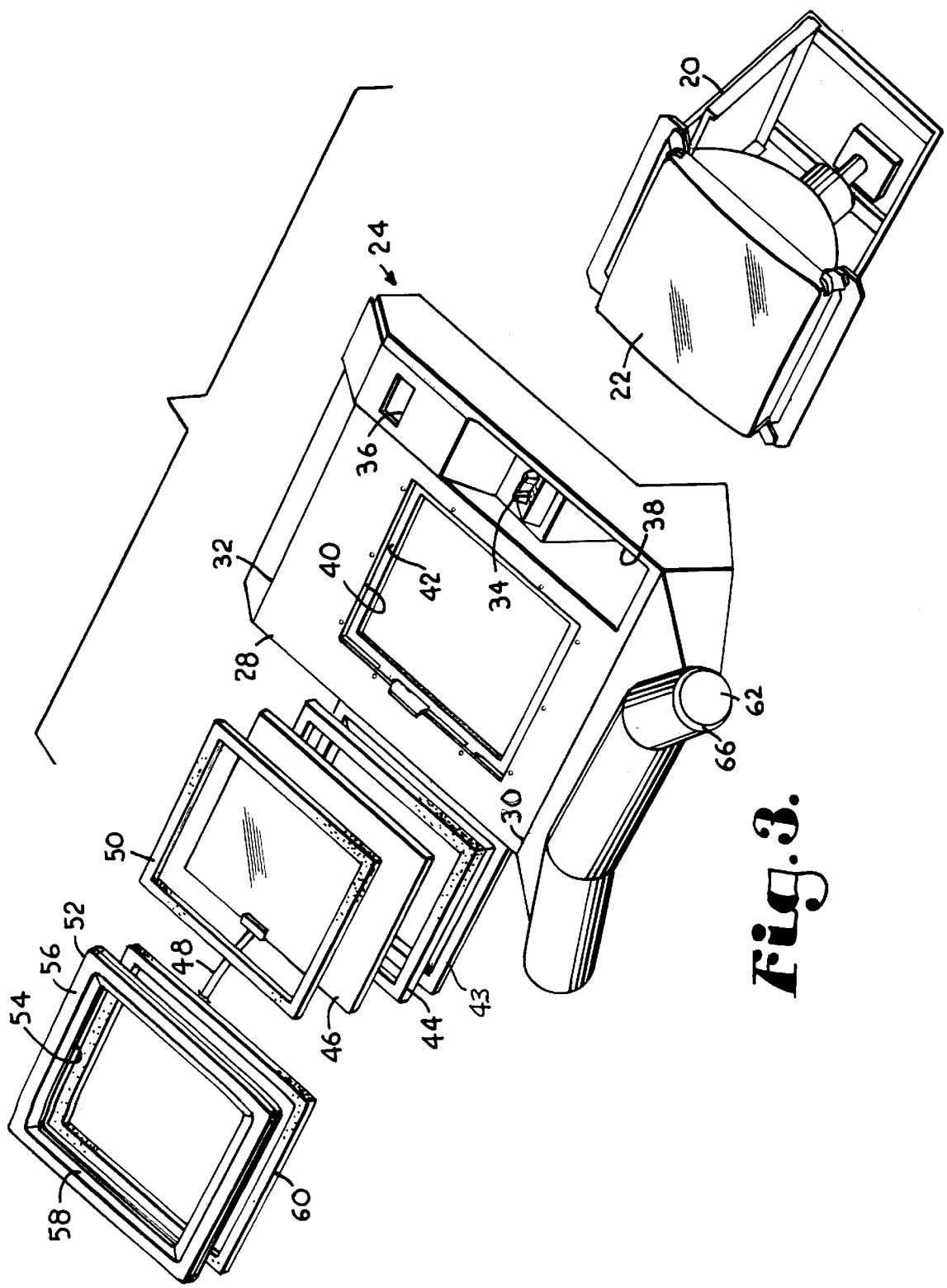
FIG. 3 is an exploded view of the deck assembly, showing its relationship to the display screen of the gaming device.

An electronic gaming device embodying the principles of this invention is broadly designated in the drawings by reference numeral 10. With initial reference to FIGS. 1 and 2, gaming device 10 has a cabinet 12 which has a front door 14, a pair of side panels 16 and a back panel 18. Mounted within cabinet 12 is a display device 20 which has a display screen 22 that can display text, graphics or a combination thereof. Suitable devices for display 20 include cathode ray tube displays and liquid crystal displays. Other displays capable of visually displaying necessary information to the player are also suitable. Display 20 is mounted within cabinet 12 as is known to those of skill in the art, and is connected to a central processing unit. The central processing unit is also contained within cabinet 12 and is used to supply display 20 with the images and text desired for the application. Cabinet 12 also contains such things as a coin acceptor and a coin hopper, which receives the coins or tokens deposited in device 10 and from which winnings are dispensed, as is known to those of skill in the art.

A deck 24 is pivotally mounted to cabinet 12, and, as best seen in FIG. 2, may be pivoted upwardly. When deck 24 is pivoted upwardly, maintenance personnel and others are allowed access to the interior of device 10. This access is necessary to perform various maintenance tasks, to clear jams, and to restock coin hoppers. A lift assist mechanism 26 is coupled between deck 24 and cabinet 12. Mechanism 26 exerts an upward force on deck 24, making it easier to pivot deck 24 upwardly away from cabinet 12. Mechanism 26 may also be provided with a retainer to hold deck 24 in an open position, as is shown in FIG. 2. Suitable lift assists are known to those of skill in the art, and include air and hydraulic cylinders, as well as gas springs.

As best shown in FIG. 3, deck 24 has a top face 28 that is angled upwardly from a front portion 30 to a rear portion 32. Face 28 has disposed therein a coin slot 34, into which players will deposit coins to operate device 10. Slot 34 is in communication with the coin hopper, such that coins placed in slot 34 are routed to the coin acceptor and then to the coin hopper. A display panel 36 is located above slot 34, and is used to indicate the number of coins deposited in device 10, or the number of credits the player has remaining. Immediately below coin slot 34 is a coin bucket 38. Bucket 38 is used to return coins to the player when the player wins, or cashes out.

Face 28 has a generally rectangular opening 40 that is positioned over screen 22. Preferably, opening 40 is larger than the viewing area of screen 22. A support 42 is coupled to the back side of face 28 about the perimeter of opening 40. Preferably, support 42 is welded to deck 24, although other suitable attaching methods could be used. As best seen in FIG. 5, support 42 extends inwardly from face 28 to provide an inset support surface. A CRT shadow bezel 43 is placed within opening 40 and supported by support 42. Shadow bezel 43 masks internal and external lights and reflections from the player's eyes. Shadow bezel 43 is opaque and is preferably black in color. Then a generally rectangular cushioning seal 44 is placed within opening 40 and is supported by shadow bezel 43. Cushioning seal 44 is preferably made from foam rubber, although any number of sealing materials, including felt, neoprene and gasket material, would be suitable. As best seen in FIG. 5, the inner perimeter of seal 44 is aligned with the inner perimeter of support 42. Both inner perimeters are sized to be larger than the viewing area of screen 22.

Placed upon seal 44 within opening 40 is a touchscreen 46. Touchscreen 46 allows the player to indicate which of the various choices displayed on screen 22 he or she desires simply by pointing to and making contact with the touchscreen associated with that choice. Touchscreen 46 may use surface acoustic wave, guided acoustic wave or capacitive technology, or any other suitable technology, as is known to those of skill in the art. Touchscreen 46 is equipped with a cable 48 that allows it to communicate with the central processing unit. The central processing unit controls the text or graphics displayed on screen 22. When a player presses a certain area of touchscreen 46 corresponding to an area of screen 22, that information is communicated to the central processing unit. The central processing unit uses this information to continue the game being played. Because touchscreen 46 is not supported by display 20, it is necessary to make sure that touchscreen 46 is sufficiently durable to resist breakage under certain conditions. Suitably durable touchscreens, such as a tempered glass touchscreen or a laminated glass touchscreen may be used.

Placed on top of touchscreen 46 about the perimeter thereof is a second, generally rectangular seal 50. Seal 50 is similar to seal 44 and is preferably made from foam rubber. Seal 50 acts to seal the area between touchscreen 46 and a bezel 52. As best seen in FIG. 5, seal 50 has an inner perimeter which is aligned with an inner perimeter 54 of an opening formed in bezel 52. Bezel 52 has an outer perimeter portion 56 that is sized to cover opening 40, and an inner sloping portion 58 that extends to abut seal 50. Portion 56 is sealed about its perimeter to face 28 with a third, generally rectangular seal 60. Seals 44, 50 and 60 may be secured in place with a suitable adhesive, and are preferably slightly compressed during installation by a mounting mechanism including the tightening bolt and nut shown generally as 61 in FIG. 5.

The construction of deck 24 therefore allows touchscreen 46 to be sealingly mounted therein. Cushioning seal 44 suspends touchscreen 46 on a foam layer, thereby evenly distributing the mounting pressures placed on the touchscreen. This mounting method ensures that no areas are masked out of the touchscreen and that all areas of the touchscreen remain fully functional. Seal 50 acts to seal the area between touchscreen 46 and portion 58 of bezel 52. Finally, seal 60 seals the area between portion 56 of bezel 52 and top face 28 of deck 24. As best seen in FIG. 5, a space 51 is provided to allow clearance for any transducers and the like associated with touchscreen 46. It can therefore be seen that touchscreen 46 is mounted within deck 24 in a manner that allows the touchscreen to pivot upwardly and downwardly with deck 24. The seals provided are not compromised when deck 24 is pivoted, but rather will remain intact at all times. Therefore, when the interior of device 10 is accessed for maintenance, clearing of jams or the filling of hoppers, the seals provided will not be broken. Each of the seals provided offer a liquid-tight seal, to prevent any liquids spilled on the surface of deck 24 from penetrating the deck and causing damage to any of the internal components, such as display 20 or the central processing unit.

It can also be seen that this construction separates touchscreen 46 from display 20. It is therefore not necessary for touchscreen 46 to be curved. Preferably, touchscreen 46 is generally flat, making it easier to seal the perimeter areas thereof with seal 50. Moreover, by separating touchscreen 46 from display 20, any maintenance necessary for either touchscreen 46 or display 20 will involve only those components. In other words, if display 20 were to fail, it would not be necessary to also replace touchscreen 46.

As disclosed above, top face 28 is angled upwardly from front 30 to rear 32. Likewise, touchscreen 46 and display 20 are angled upwardly as well. By angling touchscreen 46 and display screen 22 upwardly, it has been found that the comfort of the player is increased. A preferable range of angles for face 28, touchscreen 46 and screen 22 is thirty-five degrees to forty-two degrees, with a preferred angle of thirty-eight degrees. At this angle, touchscreen 46 and screen 22 are oriented to reduce glare from overhead sources, thereby increasing the overall comfortability of the player at the machine.

Connected to deck 24 adjacent front portion 30 is an armrest 62. As best seen in FIGS. 1 and 2, each of the side panels 16 has a forwardly extending section 64 that extends generally to armrest 62. In use, a seat or stool may be provided in front of device 10. The player will sit on the seat, and may lean forwardly towards the machine, resting on and supported by armrest 62. As best seen in FIG. 3, armrest 62 is generally u-shaped, and extends inwardly towards display 20. The shape of armrest 62 acts to nest the player within the machine. This nesting better supports the player and has been found to be more comfortable than the standard, straight armrest. Armrest 62 is also preferably surrounded with a padding layer 66, to further increase the comfort of the player.

As best seen in FIGS. 1–3, display 20 and touchscreen 46 may not be centered on deck 24. Preferably, display 20 and touchscreen 46 will be nearer one side panel 16 than the other. This off-center placement allows room for coin slot 34, display panel 36 and coin bucket 38. In order to further increase player comfort, it has been found beneficial to construct armrest 62 in an asymmetrical shape. In other words, one leg of the u-shape armrest 62 is longer than the other. The longest leg of armrest 62 is located on the side of device 10 having slot 34 and bucket 38. This asymmetrical shape operates to center or nest the player over display screen 22. It has been found beneficial to center the player over screen 22, because that is the center of the player's attention for a majority of the time. Thus, the asymmetrical armrest 62 increases the comfort of the player by centering the player over screen 22.

A top box 68 is connected to cabinet 12, with any suitable attaching mechanism, such as by bolting. Top box 68 has a display area 70, which may be used to convey information to players and potential players. This information could include such things as the title of device 10, the minimum cost to operate device 10 or the potential money that could be won by playing the game.

Device 10 thus has a display screen 22 and a touchscreen 46 that are mounted at a more comfortable angle for the player. Further, device 10 is constructed to allow deck 24 to be opened or pivoted upwardly without compromising the seal between bezel 52 and touchscreen 46, because touchscreen 46 is sealed within deck 24. This construction also allows display 20 and touchscreen 46 to be separately maintenanced. Further, armrest 62 supports a player and centers the player over the centerline of the display of the gaming device, making the device more comfortable to play and use.

From the foregoing, it will be seen that this invention is one well adapted to attain all the ends and objects hereinabove set forth together with other advantages which are obvious and which are inherent to the structure. It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawings is to be interpreted as illustrative and not in a limiting sense.

Having thus described the invention, what is claimed is:

1. An electronic gaming device, comprising:

a cabinet;

an electronic display mounted within said cabinet;

a deck having a front portion and a rear portion, said deck being pivotally coupled to said cabinet to allow a pivoting movement relative to said cabinet and said display, said deck having an opening therein located generally above said display; and a touchscreen sealingly mounted to said deck within said opening;

wherein said deck is adapted to be pivoted away from said cabinet and said display while said touchscreen is sealingly mounted within said deck, thereby maintaining the seal between the touchscreen and the deck while said deck is pivoted away from said cabinet and said display.

2. The electronic gaming device of claim 1, further comprising a bezel coupled to said deck above said touchscreen.

3. The electronic gaining device of claim 2, wherein said front portion has an arm rest coupled thereto, said armrest having a recessed section that is recessed towards the rear portion.

4. The electronic gaming device of claim 3, wherein the deck has a first side and a second side, and wherein said opening and said touchscreen each have a center line nearer to said first side than said second side, said recessed section being centered about the center line of said opening and said touchscreen.

5. The electronic gaming device of claim 2, further comprising a first seal disposed between said bezel and said deck about said opening and a second seal disposed between said touchscreen and said bezel about the perimeter of said touchscreen.

6. The electronic gaming device of claim 5, further comprising a support coupled to said deck, said support acting to support said touchscreen within said opening, and a cushioning seal disposed between said touchscreen and said support, said cushioning seal acting to evenly distribute the mounting pressures placed upon said touchscreen.

7. The electronic gaming device of claim 2, wherein said deck and said display screen are angled upwardly from said front portion to said rear portion.

8. The electronic gaming device of claim 7, wherein said angle is generally between 35 degrees and 42 degrees.

9. The electronic gaming device of claim 8, wherein said touchscreen is generally planar.

10. A user interface for an electronic gaming device utilizing an electronic display screen, comprising:

a deck having a front portion and a rear portion, said deck having an opening therein that can be located generally above said display screen;

a touchscreen mounted to said deck within said opening; and a bezel coupled to said deck above said touchscreen;

wherein said bezel and said touchscreen are sealingly mounted to said deck to prevent liquid communication through said opening;

wherein said deck is adapted to be pivotally coupled to said gaming device so that when said deck and said touchscreen are be pivoted away from said cabinet and said display screen the seal between the touchscreen and the deck, and the bezel and the deck is maintained.

11. The user interface of claim 10, wherein said front portion has an arm rest coupled thereto, said armrest having a recessed section that is recessed towards the rear portion.

12. The user interface of claim 11, wherein the deck has a first side and a second side, and wherein said opening and said touchscreen each have a center line nearer to said first side than said second side, said recessed section being centered about the center line of said opening and said touchscreen.

13. The user interface of claim 10, further comprising a first seal disposed between said bezel and said deck about said opening and a second seal disposed between said touchscreen and said bezel about the perimeter of said touchscreen.

14. The user interface of claim 13, further comprising a support coupled to said deck, said support acting to support said touchscreen within said opening, and a cushioning seal disposed between said touchscreen and said support, said cushioning seal acting to evenly distribute the mounting pressures placed upon said touchscreen.

15. The user interface of claim 10, wherein said deck is coupled to the gaming device so that it is angled upwardly from said front portion to said rear portion.

16. The user interface of claim 15, wherein said angle is generally between 35 degrees and 42 degrees.

17. The user interface of claim 16, wherein said touchscreen is generally planar.

* * * * *